United States Patent [19]

Verdier

[11] Patent Number: 4,703,852
[45] Date of Patent: Nov. 3, 1987

[54] ACCESSORY BOX
[75] Inventor: Alain Verdier, Lyons, France
[73] Assignee: Black & Decker Inc., Newark, Del.
[21] Appl. No.: 834,739
[22] Filed: Feb. 28, 1986
[30] Foreign Application Priority Data Mar. 1, 1985 [FR] France ................................ 85 03053

[51] Int. Cl.⁴ ............................................ A45C 11/26
[52] U.S. Cl. .................................... 206/349; 206/373;
206/379; 220/346; 312/237; 312/DIG. 33
[58] Field of Search ........................ 220/347, 281, 346;
206/373, 349, 379; 312/237, DIG. 33

[56] References Cited
U.S. PATENT DOCUMENTS

| 1,625,945 | 4/1927 | Kuhn . | |
| 2,465,845 | 3/1949 | Carson . | |
| 3,187,926 | 6/1965 | Zimmet | 220/346 |
| 3,333,910 | 8/1967 | Swink et al. . | |
| 3,878,939 | 4/1975 | Wilcox . | |
| 3,942,630 | 3/1976 | Phillips | 220/346 |
| 4,076,117 | 2/1978 | Wisdom et al. | 220/347 |
| 4,126,224 | 11/1978 | Laauwe et al. | 220/347 |
| 4,151,912 | 5/1979 | Harrold . | |
| 4,192,422 | 3/1980 | Kotyuk | 220/346 |
| 4,458,963 | 7/1984 | Keddie . | |
| 4,535,890 | 8/1985 | Artusi | 220/346 |

FOREIGN PATENT DOCUMENTS

| 872793 | 3/1979 | Belgium . |
| 2042476 | 9/1980 | Belgium . |
| 0074896 | 3/1983 | European Pat. Off. . |
| 330022 | 5/1958 | Fed. Rep. of Germany . |
| 7217257 | 10/1972 | Fed. Rep. of Germany . |
| 2138751 | 10/1984 | United Kingdom . |

Primary Examiner—Joseph Man-Fu Moy
Attorney, Agent, or Firm—Edward D. Murphy; Harold Weinstein; Edward D. C. Bartlett

[57] ABSTRACT

An accessory box comprises a front and two sides. Each side is provided with a resilient lug which comprises a main portion which extends rearwardly to a vertical abutment and a clip which extends rearwardly from the main portion. When the accessory box is slid into a recess the vertical abutment engages the side wall of the recess and the clip maintains the accessory box in the retracted position. The accessory box can be withdrawn when the resilient lugs are pressed towards one another.

22 Claims, 8 Drawing Figures

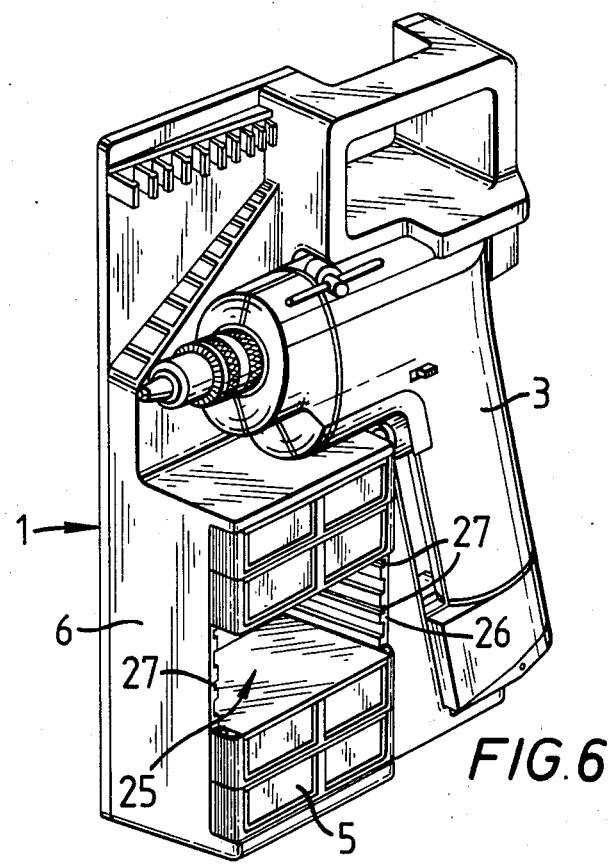
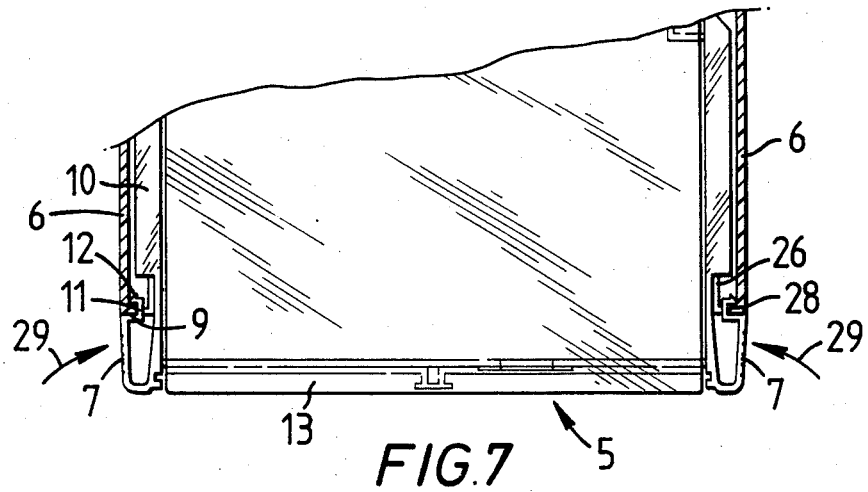

ACCESSORY BOX

FIELD OF THE INVENTION

This invention relates to an accessory box and to a portable tool and accessory carrier incorporating such an accessory box.

BACKGROUND OF THE INVENTION

It is well known to keep accessories in a cabinet comprising a plurality of accessory boxes. Generally such cabinets cannot be moved since the accessory boxes fall out of the cabinet if it is tilted. In order to render such cabinets portable it is known to place one or more bars over the fronts of the accessory boxes and secure the ends of the bar to the cabinet. However, this process is inconvenient, particularly if the cabinet is to be frequently moved.

SUMMARY OF THE INVENTION

It is an object of the invention to provide an improved accessory box.

It is a further object of the present invention to provide a portable tool and accessory carrier incorporating such an improved accessory box.

According to the present invention there is provided an accessory box adapted to be received in a recess. The accessory box comprises a front and two sides. At least one of the sides is provided with a resilient lug which projects from the one side and has an abutment surface which engages an end wall of the recess when the accessory box is pushed therein. A clip extends rearwardly from the resilient lug and retains the accessory box in the recess.

Preferably, the rearmost face of said clip is chamfered to facilitate the entry of the clip into the recess.

Advantageously, the resilient lug comprises a main portion which curves rearwardly from the front of the accessory box to the abutment, and the clip extends rearwardly therefrom.

Preferably, the height of the main portion is substantially the same as the height of the accessory box.

Advantageously the main portion diverges from the side of the accessory box.

Preferably, the accessory box further comprises a cover pivotally mounted to the back of the accessory box.

Advantageously, the cover has a locking catch which co-operates with the front of the accessory box.

Preferably, the front of the accessory box is formed with a forwardly extending recess which can support the front edge of an internal partition.

The present invention also provides a portable tool and accessory carrier which comprises a main frame; means for retaining a hand tool against the front face of the main frame; and a carrying handle. A recess is also provided which accommodates at least one accessory box which comprises a front and two sides. At least one of said sides is provided with a resilient lug which projects from the one side and has an abutment surface which engages an end wall of the recess and a clip which extends rearwardly from the resilient lug and retains the accessory box in the recess.

The accessory box may have any of the features outlined above.

Preferably, the recess is of substantially rectangular shape and accommodates a set of accessory boxes arranged in a stack.

Advantageously, the recess is provided with a plurality of slides which support the accessory boxes.

Preferably, the lower face of the main frame is provided with grooves or mouldings to increase the stability of the tool and accessory carrier in a substantially vertical position.

Advantageously, the main frame is provided with a cavity adapted to receive a charger.

Preferably, the main frame has a clip for retaining a tool on the front face thereof.

Other objects, features and advantages of the present invention will become more fully apparent from the following detailed description of the preferred embodiment, the appended claims and the accompanying drawings.

BRIEF DESCRIPTION OF THE DRAWINGS

In the accompanying drawings:

FIG. 6 is a perspective view of the portable tool and accessory carrier shown in FIG. 3, from which two accessory boxes have been removed;

FIG. 7 is a partial plan view illustrating the locking and abutment of an accessory box in its retracted position.

DETAILED DESCRIPTION OF THE PREFERRED EMBODIMENT

Figure 3:
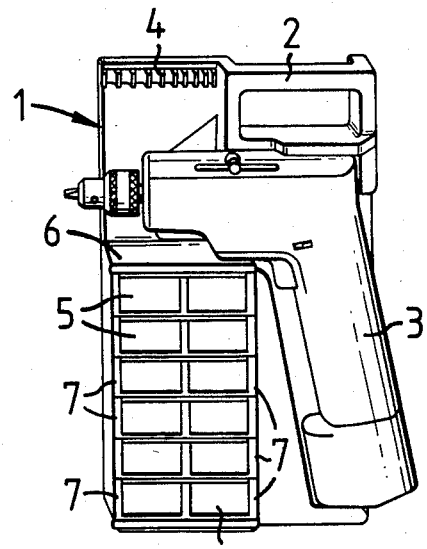
FIG. 3 is a perspective view of a portable tool and accessory carrier according to the invention, more particularly adapted to transport a rechargeable electric drill and accommodating accessory boxes of the kind shown in FIG. 1.

Referring to FIG. 3, a portable tool and accessory carrier comprises a main frame 1 which has a handle 2. A rechargeable electric drill 3 is mounted on the front of the main frame 1 as shown.

Figure 4:
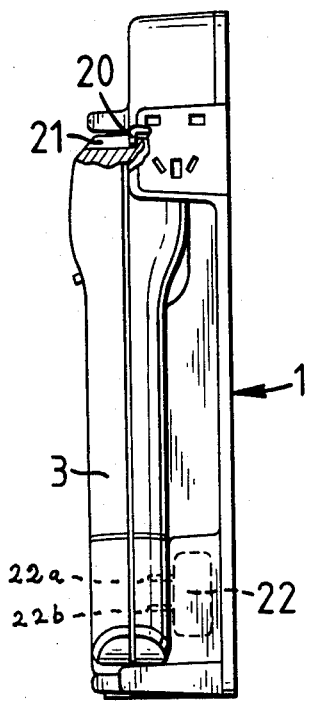
FIG. 4 is a partially cut away side elevation of a portable tool and accessory carrier shown in FIG. 3 illustrating means for retaining the rechargeable electric drill in position.
Figure 5:
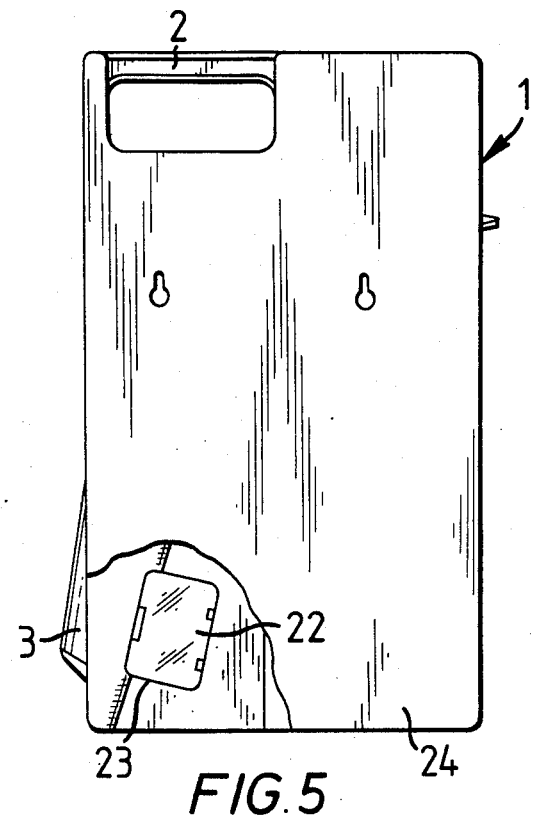
FIG. 5 is a rear elevation of the portable tool and accessory carrier shown in FIG. 3 with part cut away to show the charger for the rechargeable electric drill.

As shown in FIGS. 4 and 5, the main frame 1 is provided with a cavity 23 which houses a charger 22 having two pins 22a, 22b, which extend through the front wall of the main frame 1. The upper part of the main frame 1 is also provided with a clip 20 (FIG. 4).

The handle of the rechargeable electric drill 3 is provided with a pair of charging sockets and the head with a recess 21. When the rechargeable electric drill 3 is mounted on the portable tool and accessory carrier the clip 20 engages in the recess 21 and the charging sockets engage the pins 22a, 22b of the charger 22.

The portable tool and accessory carrier also includes a rack 4 for drill bits and a set of six accessory boxes 5.

To accommodate the accessory boxes 5 the main frame 1 has a forwardly projecting portion 6 (FIG. 6) defining a substantially vertical recess 25. Each vertical face of the recess 25 is provided with a plurality of pairs of ribs 26. Each pair of ribs is separated by a groove 27 allowing the sliding reception of lateral ribs of accessory boxes 5 which will be described in greater detail hereinafter.

Figure 1:
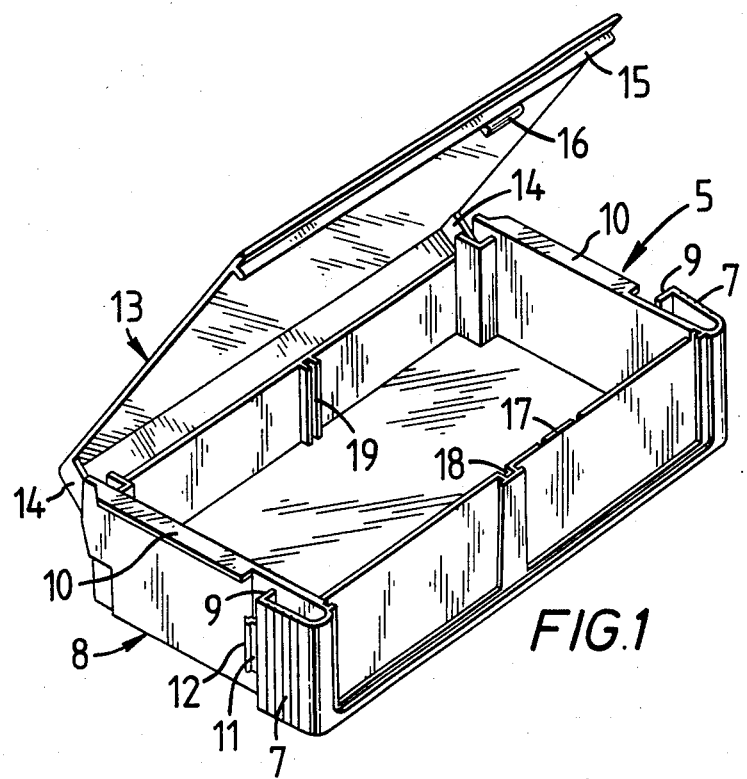
FIG. 1 is a perspective view of an accessory box according to the invention.
Figure 2:
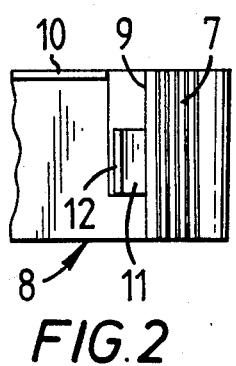
FIG. 2 shows, to an enlarged scale, part of the accessory box shown in FIG. 1.

As shown more clearly in FIGS. 1 and 2, each accessory box 5 comprises a front and two sides. A resilient lug 7 projects rearwardly from each side of the accessory box 5. Each resilient lug 7 comprises a main portion which extends rearwardly and terminates in an abutment 9 which is vertical. A clip 11 extends rearwardly from the main portion and terminates in a chamfered edge 12.

The main portion of each resilient lug 7 diverges rearwardly from the side of the accessory box 5. This feature ensures highly reliable locking engagement with a lip 28 on the edge of the recess 25.

The main portion of each resilient lug 7 is of substantially the same height as the sides of the box, thereby giving very good stability to the box in the closed position. Moreover, since the resilient lugs 7 form the outer lateral faces of the stack of boxes in the closed position two adjacent stacked boxes may be gripped and withdrawn simultaneously when the resilient lugs are pressed inwardly.

A transparent cover 13 is pivotedly mounted on the rear of the box by means of lugs 14 which are mounted on small corresponding spindles. The cover 13 is also provided with a rib 15 which carries a rounded projecting catch 16 which, during closure, co-operates with a small projecting lug 17 on the front face of the box.

It is important to note that the stack of boxes 5 is organized with minimal space between each box, so that a cover 13 can never open when the box immediately above is retracted.

A forwardly extending central recess 18 is provided in the front of each accessory box 5. A label can be inserted on either side of the central recess 18 in grooves provided for this purpose. Furthermore, an internal partition may be inserted in the central recess 18 and a groove 19 provided on the rear of the accessory box 3.

Advantageously the whole accessory box is moulded in plastics.

Independent and identical accessory boxes have been illustrated. However the boxes can be of different heights.

FIGS. 6 and 7 clearly illustrate the operation of the accessory boxes 5. In the retracted position the chamfered edges 12 are disposed behind the lip 28 of the recess 25, and the abutting edge 9 is in contact with the front of the lip 28. The accessory boxes 5 are then locked in place in a reliable manner. By pressing the resilient lug 7 with two fingers (arrows 29) the clip 11 can be displaced inwardly until the edges 12 are displaced inwardly of the lips 28. The box 5 can then be removed like a drawer. The converse operation is easily performed. When pushing the box into the recess 25; the chamfer of the edge 12 facilitates the passage of the resilient lugs 7 up to the snap-in engagement which produces locking.

Figure 8:
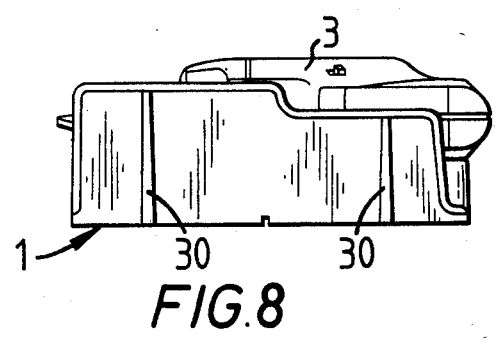
FIG. 8 is an underneath plan view of the tool and accessory carrier illustrated in FIG. 3, showing two supporting ribs for stabilizing the assembly in the upright position.

The assembly shown in FIG. 3, in the position for transport, can therefore be readily handled; the different boxes and the tool are satisfactorily retained, whatever the orientation of the assembly. As a rule the assembly will be used in one of two positions, i.e. a recumbent position (on the rear face of the tool and accessory carrier) or an upright position. To improve the stability of the upright position the lower face of the main frame is formed with grooves, ribs or mouldings (reliefs 30 FIG. 8) which enable the assembly to be very slightly inclined rearwardly (by a few degrees) in relation to the vertical, to take into account the weight of the tool.

It is important to note that the invention is not limited to the portable tool and accessory carrier for a rechargeable electric drill as shown in FIG. 3, but also covers a portable tool and accessory carrier adapted to receive accessories and able to receive and keep in place other hand tools, for example screwdrivers, such carrier receiving accessory boxes similar to the one described and therefore forming an autonomous accessory module.

It should be noted that whilst the lip 28 is highly desirable it is not absolutely essential and that the accessory boxes 5 could be retained in position in the recess 25 by the pressure of the resilient lugs 7 acting on the walls of the recess 25 above.

The above described embodiment, of course, is not to be construed as limiting the breadth of the present invention. Modifications, and other alternative constructions, will be apparent which are within the scope of the invention as defined in the appended claims.

What is claimed is:

1. A portable tool and accessory carrier, comprising:
    (a) a main frame having a front face;
    (b) a charger mounted in said main frame;
    (c) first means for releasably retaining a rechargeable portable electric tool on said front face;
    (d) said rechargeable electric tool having charging contacts engaged with said charger when said electric tool is retained on said front face by said first means;
    (e) a recess defined in said main frame;
    (f) at least one accessory box slidably mounted in said recess and movable between a stored position in said recess and a withdrawn position; and
    (g) second means for releasably retaining said accessory box in said stored position.

2. The carrier of claim 1, wherein:
    said rechargeable electric tool is a drill having a head portion and a handle portion;
    said first means comprises a clip on said main frame engageable with a recess formed in said head portion of said drill;
    said charging contacts are provided in charging sockets in said handle portion; and
    said charger has pins engageable with said sockets.

3. The carrier of claim 2, wherein in a vertical position of said main frame with said drill retained on said front face said dril head portion is disposed above said recess and said drill handle portion is disposed to one side of said recess.

4. The carrier of claim 1, wherein: said main frame has a forwardly projecting portion in which said recess is defined;
    said rechargeable electric tool has a head portion and a handle portion;
    said first retaining means comprises a clip on said main frame engageable in a recess in said tool head portion; and
    said tool head portion extends over said main frame projecting portion and said tool handle portion extends downwardly outside one side of said main frame projecting portion when said main frame is in a vertical position.

5. The carrier of claim 4, wherein:

said tool handle portion contains said charging contacts;

said charger is housed in a cavity in said main frame;

said main frame is provided with a carrying handle disposed above said tool head portion when said tool is retained on said front face; and said main frame has associated with a bottom thereof means for enabling said main frame to stand on said bottom in said vertical position but inclined rearwardly by a few degrees in relation to the vertical to take into account the weight of said rechargeable electric tool.

6. A portable tool and accessory carrier which comprises:

(a) a main frame;

(b) means for retaining a rechargeable electric tool against a front face of said main frame;

(c) a charger mounted in said main frame;

(d) said rechargeable electric tool having charging contacts in electrical contact with said charger when retained against said front face by said retaining means;

(e) said main frame having a carrying handle;

(f) a recess defined by said main frame and accommodating at least one accessory box, said accessory box comprising a front and two sides, wherein at least one of said sides is provided with a resilient lug which projects from said one side and has an abutment surface engaging an end wall of said recess and a clip which extends rearwardly from said resilient lug and retains said accessory box in said recess; and (g) said rechargeable electric tool when retained by said retaining means having a portion disposed between said recess and said handle and having another portion disposed to one side of said recess, said another portion having said charging contacts.

7. The carrier as claimed in claim 6, wherein a rearmost face of said clip is chamfered to facilitate entry of said clip into said recess.

8. The carrier as claimed in claim 6, wherein said resilient lug comprises a main portion which curves rearwardly from the front of said accessory box to said abutment surface, and said clip extends rearwardly therefrom.

9. The carrier as claimed in claim 6, wherein the height of said main portion is substantially the same as the height of the accessory box.

10. The carrier as claimed in claim 8, wherein the main portion diverges from said one side of the accessory box.

11. The carrier as claimed in claim 6, further comprising a cover pivotally mounted to a back of the accessory box.

12. The carrier as claimed in claim 11, wherein said cover has a locking catch which co-operates with the front of the accessory box.

13. The carrier as claimed in claim 6, wherein said recess is of substantially rectangular shape and accommodates a set of accessory boxes arranged in a stack.

14. The carrier as claimed in claim 13, wheein said recess is provided with a plurality of slides which support said accessory boxes.

15. The carrier according to claim 6, wherein a lower face of the main frame is provided with grooves or mouldings to increase the stability of the tool and accessory carrier in a substantially vertical position.

16. The carrier according to claim 6, wherein said charger is in a cavity in the main frame.

17. The carrier as claimed in claim 6, wherein said retaining means comprises a clip for retaining said tool on said front face.

18. A portable tool and accessory carrier which comprises:

(a) a main frame having a cavity housing a charger;

(b) a clip for retaining a rechargeable electric drill on the front face of said main frame;

(c) a rechargeable electric drill retained on said main frame by said clip and having charging contacts in contact with said charger;

(d) a recess defined by said main frame;

(e) a plurality of slides disposed on the sides of said recess; and (f) a plurality of accessory boxes slidable mounted on said slides, said accessory boxes each having a front and two sides, and wherein each side is provided with a resilient lug which extends rearwardly from each side and has a main portion which is of substantially the same height as the respective accessory box and terminates in a substantially vertical abutment which engages a vertical wall of said recess, and a clip which extends rearwardly from said main portion and engages a wall of said recess to retain the respective accessory box in said recess, said clip having a chamfered surface to facilitate entry into said recess.

19. The carrier of claim 18, wherein the main portion diverges from the respective side of each accessory box.

20. The carrier of claim 18, further comprising a cover pivotally mounted to a back of each accessory box.

21. The carrier of claim 18, wherein said cover has a locking catch which co-operates with the front of the respective accessory box.

22. The carrier of claim 18, wherein the front of each accessory box is formed with a forwardly extending recess which can support the front edge of an internal partition.

* * * * *